US 6,673,296 B2

(12) United States Patent
Hiraiwa et al.

(10) Patent No.: US 6,673,296 B2
(45) Date of Patent: Jan. 6, 2004

(54) PRODUCTION METHOD FOR FORMING A TRIM COMPONENT

(75) Inventors: Yoshihiko Hiraiwa, Aichi-ken (JP); Michael J. VonHoltz, Holland, MI (US); Raul Gerhardus, Holland, MI (US); Michael T. McCully, Grand Rapids, MI (US); Dean D. Petrick, Hamilton, MI (US); John P. Maurer, West Olive, MI (US)

(73) Assignees: Johnson Controls Technology Company, Plymouth, MI (US); Araco Kabushiki Kaisha, Toyota (JP)

( * ) Notice: Subject to any disclaimer, the term of this patent is extended or adjusted under 35 U.S.C. 154(b) by 354 days.

(21) Appl. No.: 09/871,168

(22) Filed: May 31, 2001

(65) Prior Publication Data

US 2002/0017360 A1 Feb. 14, 2002

(30) Foreign Application Priority Data

May 31, 2000 (JP) ........................ 2000-162681

(51) Int. Cl.⁷ ..................... B29C 45/26; B29C 45/33
(52) U.S. Cl. ..................... 264/275; 264/279
(58) Field of Search ..................... 264/275, 279, 264/263; 425/110

(56) References Cited

U.S. PATENT DOCUMENTS

| 4,323,406 A | 4/1982 | Morello ..................... 156/91 |
| 4,709,757 A | 12/1987 | Bly ........................... 164/173 |
| 4,873,041 A | 10/1989 | Masui et al. ................ 264/135 |
| 4,874,564 A | 10/1989 | Sudani et al. ............... 264/24.7 |
| 5,034,076 A | 7/1991 | Masui et al. ................ 156/79 |

(List continued on next page.)

FOREIGN PATENT DOCUMENTS

| EP | 018 951 | 11/1980 |
| EP | 145 812 | 6/1985 |
| EP | 0472199 | 2/1992 |

(List continued on next page.)

Primary Examiner—Adrienne C. Johnstone
Assistant Examiner—Barbara J. Musser
(74) Attorney, Agent, or Firm—Foley & Lardner

(57) ABSTRACT

A production apparatus of an interior trim component covered with a surface skin material having a plurality of different portions in such a manner that each boundary line of the different portions is hidden in a groove or valley provided in the substrate of the trim component, which includes a pair of confronted molding dies, a carrying-in device for introducing the surface skin material into a space between the confronted molding dies in such a manner that the boundary line of the surface skin material is positioned in engagement with the corresponding internal projection formed on a molding surface of either one of molding dies, a thrust mechanism including a thrust member assembled within the other molding die to be projected from its molding surface toward the internal projection of the confronted molding die and retractable therefrom and an actuator mounted to the other molding die for forwarding the thrust member toward the internal projection so that a distal end of the thrust member is brought into engagement with the boundary line of the surface skin material to retain the surface skin material in place on the internal projection of the confronted molding die, an injection device mounted to file other molding die for injecting melted synthetic resin into a space between the molding dies clamped with each other to form the substrate of the trim component with the surface skin material, wherein the carrying-in device is operated to introduce the surface skin material into the space between the confronted molding dies and retracted to the exterior after the thrust member was brought into engagement with the boundary line of the surface skin material, and wherein the thrust member is maintained in engagement with the surface skin material until the melted synthetic resin is injected by operation of the injection device.

7 Claims, 9 Drawing Sheets

U.S. PATENT DOCUMENTS

| | | | |
|---|---|---|---|
| 5,091,031 A | 2/1992 | Strapazzini | 156/211 |
| 5,114,660 A | 5/1992 | Hendry | 264/572 |
| 5,122,320 A | 6/1992 | Masui et al. | 264/155 |
| 5,151,237 A | 9/1992 | Hettinga | 264/257 |
| 5,154,872 A | 10/1992 | Masui et al. | 264/266 |
| 5,178,708 A | 1/1993 | Hara et al. | 156/242 |
| 5,197,935 A | 3/1993 | Schweri | 493/85 |
| 5,204,127 A | 4/1993 | Prusha | 425/544 |
| 5,260,014 A | 11/1993 | Holton et al. | 264/134 |
| 5,275,764 A | 1/1994 | Hettinga | 264/1.9 |
| 5,281,376 A | 1/1994 | Hara et al. | 264/46.4 |
| 5,340,425 A | 8/1994 | Strapazzini | 156/211 |
| 5,352,397 A | 10/1994 | Hara et al. | 264/153 |
| 5,407,342 A | 4/1995 | Boucher et al. | 425/145 |
| 5,422,059 A | 6/1995 | Hettinga | 264/328.1 |
| 5,427,864 A | 6/1995 | Hikasa et al. | 428/521 |
| 5,437,547 A | 8/1995 | Holton et al. | 425/548 |
| 5,462,422 A | 10/1995 | Gustavel et al. | 425/129.1 |
| 5,468,039 A | 11/1995 | Matsumoto et al. | 296/70 |
| 5,478,627 A | 12/1995 | Hara et al. | 428/156 |
| 5,485,950 A | 1/1996 | Shibata et al. | 228/194 |
| 5,509,990 A | 4/1996 | Masui et al. | 156/242 |
| 5,516,582 A | 5/1996 | Hikasa et al. | 428/319.9 |
| 5,529,742 A | 6/1996 | Strapazzini | 264/511 |
| 5,543,094 A | 8/1996 | Hara et al. | 264/46.4 |
| 5,562,797 A | 10/1996 | Phelps | 156/510 |
| 5,562,878 A | 10/1996 | Matsumoto et al. | 264/513 |
| 5,565,053 A | 10/1996 | Happich | 156/216 |
| 5,585,061 A | 12/1996 | Hara et al. | 264/259 |
| 5,593,631 A | 1/1997 | Hara et al. | 264/257 |
| 5,618,567 A | 4/1997 | Hara et al. | 425/111 |
| 5,622,667 A | 4/1997 | Fujiyama et al. | 264/266 |
| 5,662,948 A | 9/1997 | Sjoberg | 425/195 |
| 5,672,403 A | 9/1997 | Hara et al. | 428/95 |
| 5,679,301 A | 10/1997 | Miklas et al. | 264/161 |
| 5,714,104 A | 2/1998 | Bailey et al. | 264/254 |
| 5,714,175 A | 2/1998 | Masui et al. | 425/123 |
| 5,756,406 A | 5/1998 | Rittman et al. | 442/117 |
| 5,759,464 A | 6/1998 | Matsumoto et al. | 264/138 |
| 5,759,594 A | 6/1998 | Masui et al. | 425/510 |
| 5,762,852 A | 6/1998 | Hettinga | 264/251 |
| 5,766,751 A | 6/1998 | Kotani et al. | 428/323 |
| 5,770,134 A | 6/1998 | Hara et al. | 264/154 |
| 5,773,038 A | 6/1998 | Hettinga | 425/145 |
| 5,783,132 A | 7/1998 | Matsumoto et al. | 264/257 |
| 5,783,133 A | 7/1998 | Hara et al. | 264/261 |
| 5,795,526 A | 8/1998 | Matsumoto et al. | 264/266 |
| 5,820,813 A | 10/1998 | Hara et al. | 264/511 |
| 5,830,402 A | 11/1998 | Harada et al. | 264/266 |
| 5,833,899 A | 11/1998 | Wunderlich | 264/40.4 |
| 5,847,961 A | 12/1998 | Jones et al. | 364/477.01 |
| 5,851,619 A | 12/1998 | Sakai et al. | 428/57 |
| 5,869,573 A | 2/1999 | Kuroda et al. | 525/66 |
| 5,885,515 A | 3/1999 | Hudkins | 264/516 |
| 5,902,533 A | 5/1999 | Munger et al. | 264/254 |
| 5,945,053 A | 8/1999 | Hettinga | 264/171.13 |
| 5,968,440 A | 10/1999 | Hettinga | 264/328.1 |
| 6,149,998 A | 11/2000 | Hettinga | 428/44 |
| 6,214,157 B1 * | 4/2001 | Spengler | 156/304.6 |
| 6,251,326 B1 | 6/2001 | Siano et al. | 264/328.8 |
| 6,368,093 B1 | 4/2002 | Vecchiarino et al. | 425/130 |

FOREIGN PATENT DOCUMENTS

| | | |
|---|---|---|
| EP | 482 270 | 4/1992 |
| EP | 502 672 | 9/1992 |
| EP | 491 682 | 5/1993 |
| EP | 475 198 | 5/1995 |
| EP | 0676267 | 10/1995 |
| EP | 376 263 | 12/1995 |
| EP | 481 090 | 12/1996 |
| EP | 0829337 | 3/1998 |
| EP | 719 625 | 8/2002 |
| FR | 2744947 | 8/1997 |
| JP | 61230920 | 10/1986 |
| JP | 01-195011 | 8/1989 |
| JP | 02047021 | 2/1990 |
| JP | 02-167713 | 6/1990 |
| JP | 2654623 | 7/1990 |
| JP | 02-206513 | 8/1990 |
| JP | 05-016163 | 1/1993 |
| JP | 07-195430 | 8/1995 |
| JP | 07-195433 | 8/1995 |
| JP | 08118413 | 5/1996 |
| JP | 08-197575 | 8/1996 |
| JP | 09-019942 | 1/1997 |
| JP | 09-277302 | 10/1997 |
| JP | 09-286042 | 11/1997 |
| JP | 10086180 | 4/1998 |
| JP | 628 394 | 8/1998 |
| JP | 11058396 | 3/1999 |
| WO | WO 92/16349 | 10/1992 |
| WO | WO 97/46363 | 12/1997 |

* cited by examiner

PRODUCTION METHOD FOR FORMING A TRIM COMPONENT

BACKGROUND OF THE INVENTION

1. Field of the Invention

The present invention relates to a production method and apparatus of an interior trim component such as interior door panels, dashboards and the like for an automotive vehicle, and more particularly to a production method and apparatus of an interior trim component covered with plural kinds of surface skin materials in such a manner that the splice line of the surface skin materials is hidden within a groove or valley provided in a substrate of the trim component 2. Discussion of the Prior Art For production of an interior trim component of this kinds, it is required to accurately position the splice line of surface skin materials in a molding die thereby to hide the splice line within a groove or valley provided in a substrate of the trim component. To satisfy the requirements, disclosed in Japanese Patent Laid-open Publication 61-230920 are a method of clamping each edge portion of surface skin materials to a stationary plate projected from a recessed portion of a molding die for formation of the groove or valley in the substrate, a method of retaining surface skin materials in place by overlapping the surface skin materials at their edge portions and sticking the overlapped edge portions to equally spaced needles projected from a stationary plate in a molding die, and a method of adhering each edge portion of surface skin materials to a stationary plate in a molding die by means of a double-faced adhesive tape.

In the first method described above, separate clips are used for clamping the surface skin materials to the stationary plate, resulting in an increase of the manufacturing cost. In the second method described above, it is required to make the stationary plate as thinner as possible for reducing the width of the groove or valley in the substrate. For this reason, thin needles used as the needles projected from the stationary plate are easily broken. In the third method, the adhesive force of the tape is decreased by use of two or three times. It is, therefore, required to replace the adhesive tape with new one. In any case, the surface skin materials have to be manually introduced into the molding die and mounted in place. Accordingly, the foregoing methods are unsuitable for mass-production of this kind of trim components.

SUMMARY OF THE INVENTION

It is, therefore, a primary object of the present invention to provide a production method and apparatus suitable for mass production of this kind of interior trim components.

According to the present invention, there is provided a production method of an interior trim component covered with a surface skin material having a plurality of different portions in such a manner that each boundary line of the different portions is hidden in a groove or valley provided in the substrate of the trim component, comprising the steps of introducing the surface skin material into a space between a pair of confronted molding dies and positioning the boundary line of the surface skin material in engagement with the corresponding internal projection formed on a molding surface of one of the molding dies; forwarding a thrust member assembled within the other molding die to be projected from its molding surface toward the internal projection of the confronted molding die and retractable therefrom and bringing a distal end of the thrust member into engagement with the boundary line of the surface skin material to retain the surface skin material in place on the internal projection of the confronted molding die; clamping the molding dies in a condition where the distal end of the thrust member is maintained in engagement with the boundary line of the surface skin material positioned on the internal projection; and injecting melted synthetic resin into a space between the molding dies to form a substrate of the trim component with the surface skin material in a condition where the thrust member is retracted by the melted synthetic resin filled in the space between the molding dies.

In the production method of the interior trim component, it is preferable that the surface skin material is in the form of plural kinds of surface skin materials preliminarily spliced at their edge portions, wherein the spliced portion of the surface skin materials is positioned in engagement with the corresponding internal projection of the molding die and retained in place by engagement with the distal end of the thrust member. It is also preferable that the thrust member is formed at its distal end with a recess for engagement with the surface skin material at its boundary line positioned in place on the internal projection of the molding die.

According to an aspect of the present invention, there is provided a production apparatus of an interior trim component covered with a surface skin material having a plurality of different portions in such a manner that each boundary line of the different portions is hidden in a groove or valley provided in the substrate of the trim component, which comprises a pair of confronted molding dies; a carrying-in device for introducing the surface skin material into a space between the confronted molding dies in such a manner that the boundary line of the surface skin material is positioned in engagement with the corresponding internal projection formed on a molding surface of either one of molding dies; a thrust mechanism including a thrust member assembled within the other molding die to be projected from its molding surface toward the internal projection of the confronted molding die and retractable therefrom and an actuator mounted to the other molding die for forwarding the thrust member toward the internal projection so that a distal end of the thrust member is brought into engagement with the boundary line of the surface skin material to retain the surface skin material in place on the internal projection of the confronted molding die; an injection device mounted to the other molding die for injecting melted synthetic resin into a space between the molding dies clamped with each other to form the substrate of the trim component with the surface skin material; wherein the carrying-in device is operated to introduce the surface skin material into the space between the confronted molding dies and retracted to the exterior after the thrust member was brought into engagement with the boundary line of the surface skin material, and wherein the thrust member is maintained in engagement with the surface skin material until the melted synthetic resin is injected by operation of the injection device.

In the production apparatus of the interior trim component, it is preferable that wherein the surface skin material is in the form of plural kinds of surface skin materials preliminarily spliced at their edge portions, wherein the carrying-in device is operated to position the spliced portion of the surface skin material in engagement with the corresponding internal projection of the molding die, and wherein the thrust member is forwarded by operation of the actuator to retain the surface skin material in place in the molding die at its distal end. It is also preferable that the molding surface of the other molding die is formed with a boundary recess corresponding with the internal projection of the confronted molding die and that the distal end of the thrust member is located to coincide with a bottom of the boundary recess in a condition where the actuator of the thrust mechanism is inoperative and forwarded toward the internal projection of the confronted molding die by operation of the actuator.

It is further preferable that the thrust member is formed at its distal end with a recess for engagement with the surface skin material at its boundary line positioned in place on the internal projection of the molding die. In addition, the one of the molding dies may be formed at its molding surface with an addition internal projection for engagement with) a peripheral edge portion of the surface skin material retained by engagement with the first-named internal projection in a condition where the molding dies were clamped. In such a case, the thrust mechanism is further provided with an additional thrust member assembled within the other molding die to be projected from its molding surface toward the additional internal projection of the confronted molding die and retractable therefrom and an actuator mounted to the other molding die for forwarding the additional thrust member toward the additional internal projection so that a distal end of the additional thrust member is brought into engagement with the peripheral edge portion of the surface skin material to retain the surface skin material in place.

BRIEF DESCRIPTION OF THE DRAWINGS

Other objects, features and advantages of the present invention will be more readily appreciated from the following detailed description of preferred embodiments thereof when taken together with the accompanying drawings, in which.

DESCRIPTION OF THE PREFERRED EMBODIMENTS

Figure 8:
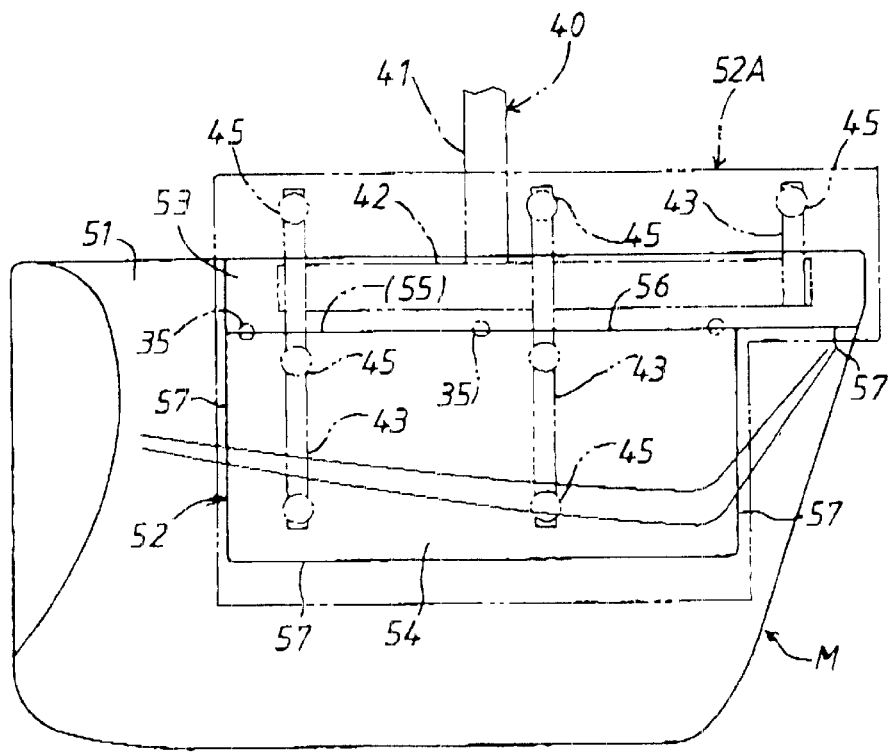
FIG. 8 is a front view of the interior door panel produced by the molding machine.

Illustrated in FIGS. 1 to 9 of the drawings is a preferred embodiment of the present invention adapted for production of an interior door trim panel M for an automotive vehicle. As shown in FIG. 8, the interior door trim panel M is composed of a substrate material 51 of predetermined thickness and stiffness covered with a soft surface skin 52. The surface skin 52 of panel M is formed with a lateral groove or valley 56 and is different in color and decorative pattern at its upper and lower portions. A groove or valley 57 is formed at a boundary line between the substrate material 51 and the outer periphery of surface skin 52.

As shown in FIGS. 1 to 4, a molding machine for production of the door trim panel M includes a set of confronted molding dies 10 and 20 respectively in the form of a core die and a cavity die. The left-hand core die 10 is mounted on a stationary support frame (not shown) through an attachment plate 18, while the right-hand cavity die 20 is mounted on a movable support frame (not shown) through an attachment plate 28. The molding dies 10 and 20 are formed with molding surfaces 11 and 21 confronted with each other and abutment surfaces 11a and 21 extended outward from each outer periphery of the molding surfaces 11 and 21. The right-hand cavity die 20 is provided at its molding surface 21 with internal projections 22 and 23 for forming the lateral groove or valley 56 and boundary groove or valley 57, respectively. On the other hand, the left-hand core die 10 is provided at its molding surface 11 with a lateral recess 12a and a boundary recess, respectively corresponding with the internal projections 22 and 23.

Figure 9:
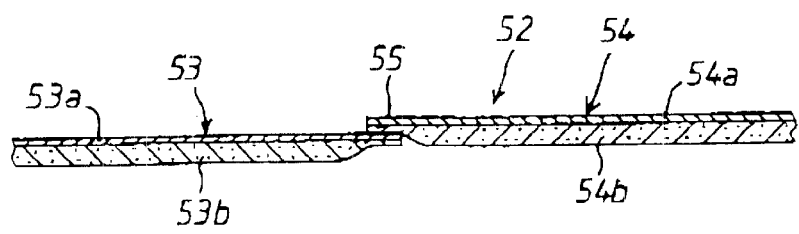
FIG. 9 is an enlarged sectional view illustrating the splice of the surface skin materials shown in FIG. 1.

In this embodiment, as illustrated in FIGS. 8 and 9, the surface skin 52 of the door trim panel is composed of two kinds of surface skin materials 53 and 54 different in color, decorative pattern, degrees of soft touch or the like. As clearly shown in FIG. 9, the surface skin materials 53 and 54 are preliminarily overlapped at their edge portions and jointed with each other in a splice line by ultrasonic welding. The surface skin material 53 is in the form of a surface skin layer 53a such as a synthetic resin sheet, a leather, a fabric or the like laminated at its rear surface with a foamed layer 53b such as a foamed sheet of elastic synthetic resin (for example, a foamed olefin resin sheet of 2–3 mm in thickness). Similarly, the surface skin material 54 is in the form of a surface skin layer 54a such as a synthetic resin sheet, a leather, a fabric or the like laminated at its rear surface with a foamed layer 54b such as a foamed sheet of elastic synthetic resin (for example, a foamed olefin resin sheet of 2–3 mm in thickness).

In actual practices of the present invention, the surface skin 52 may be composed of more than three kinds of surface skin materials. Although the surface skin materials have been continually spliced on a time, the surface skin materials may be jointed or spliced at spaced points in such a manner as to obtain sufficient joint strength. The surface skin 52 may be composed of a sheet of surface skin material the surface of which is divided into a plurality of different color or decorative pattern.

Figure 1:
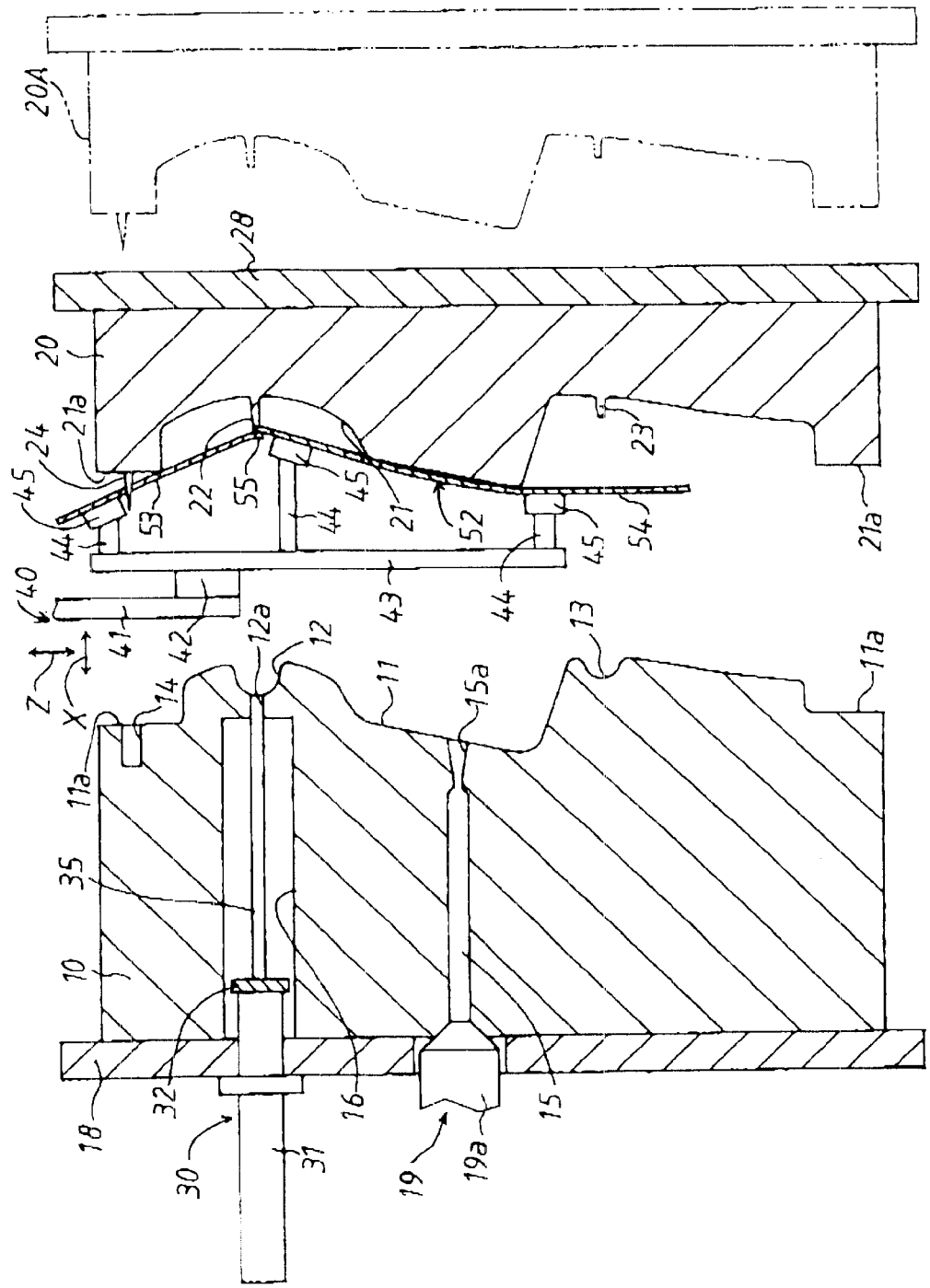
FIG. 1 is a vertical sectional view illustrating an introducing process of spliced surface skin materials into a molding machine used for production of an interior door panel in accordance with the present invention.

As shown in FIGS. 1 and 8, a carrying-in device 40 for introducing the surface skin 52 into the cavity die 20 is composed of a plurality of spaced vertical beams 43 connected by a cross-beam 42 and a plurality of spaced absorptive cups 45 mounted to the vertical beams 43 by means of leg members 44. The carrying-in device 40 is operated by an industrial robot (not shown) through an arm 42 fixed to the cross-beam 42 as described below.

Prior to bringing the preliminarily spliced surface skin materials 53, 54 into the cavity die 20 of the molding machine, the surface skin materials 53, 54 are horizontally placed on a support tool in a condition where the surface layers 53a, 54a are placed downward. Thereafter, the carrying-in device 40 is operated by the industrial robot in such a manner that the absorption cups 45 are brought into engagement with the foamed layers 53b, 54b of surface skin materials 53, 54 transferred in place and applied with negative pressure to retain the surface skin materials 53, 54. Subsequently, the carrying-in device 40 is operated by the industrial robot in such a manner that the surface skin materials 53, 54 retained by the absorptive cups 45 are placed in a vertical direction and brought into a space between the confronted molding dies 10 and 20 and that the spliced portion 55 of surface skin materials 53, 54 is positioned and maintained in engagement with the projection 22 formed in the cavity die 20.

Figure 2:
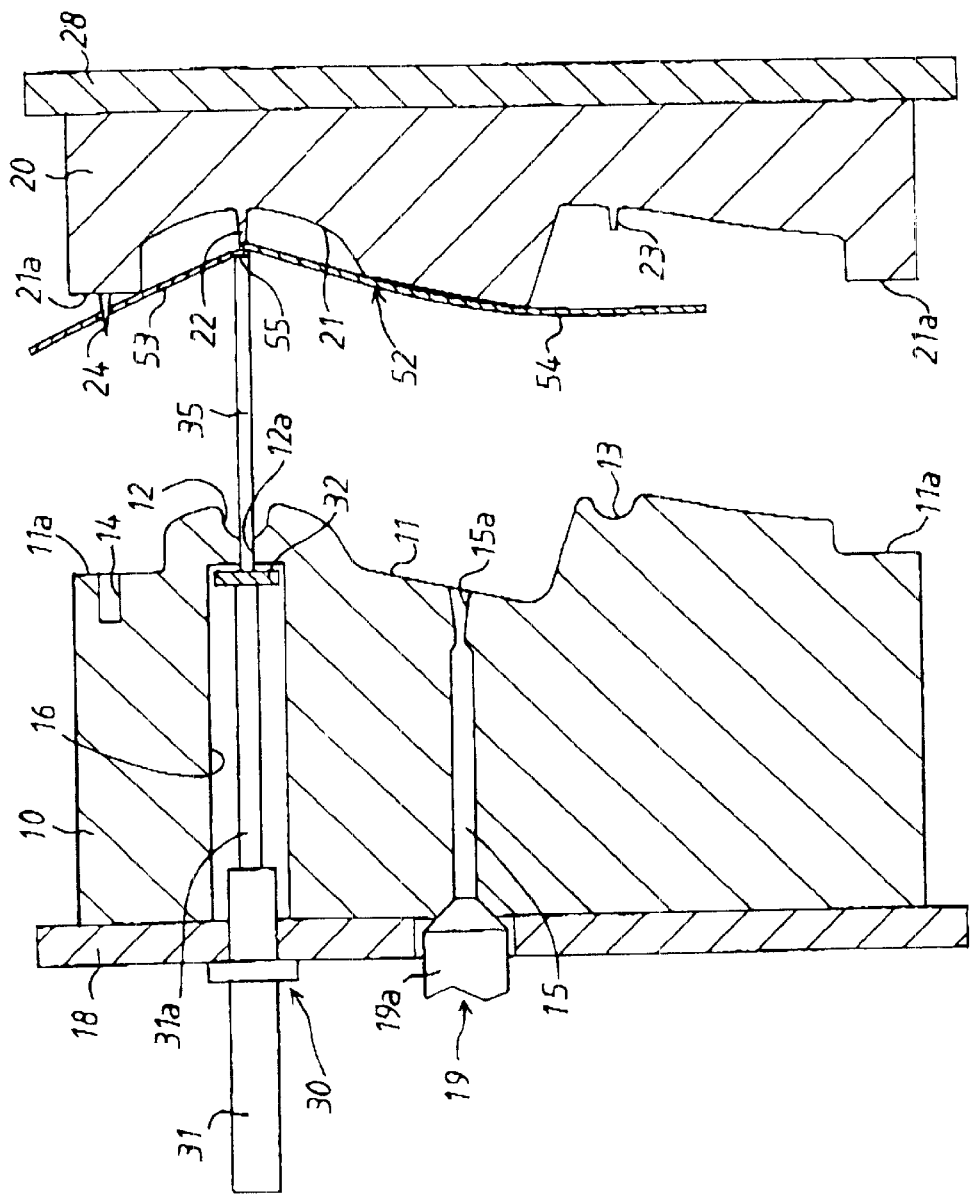
FIG. 2 is a vertical sectional view illustrating a clamping process of the spliced portion of the surface skin materials in the molding machine.
Figure 3:
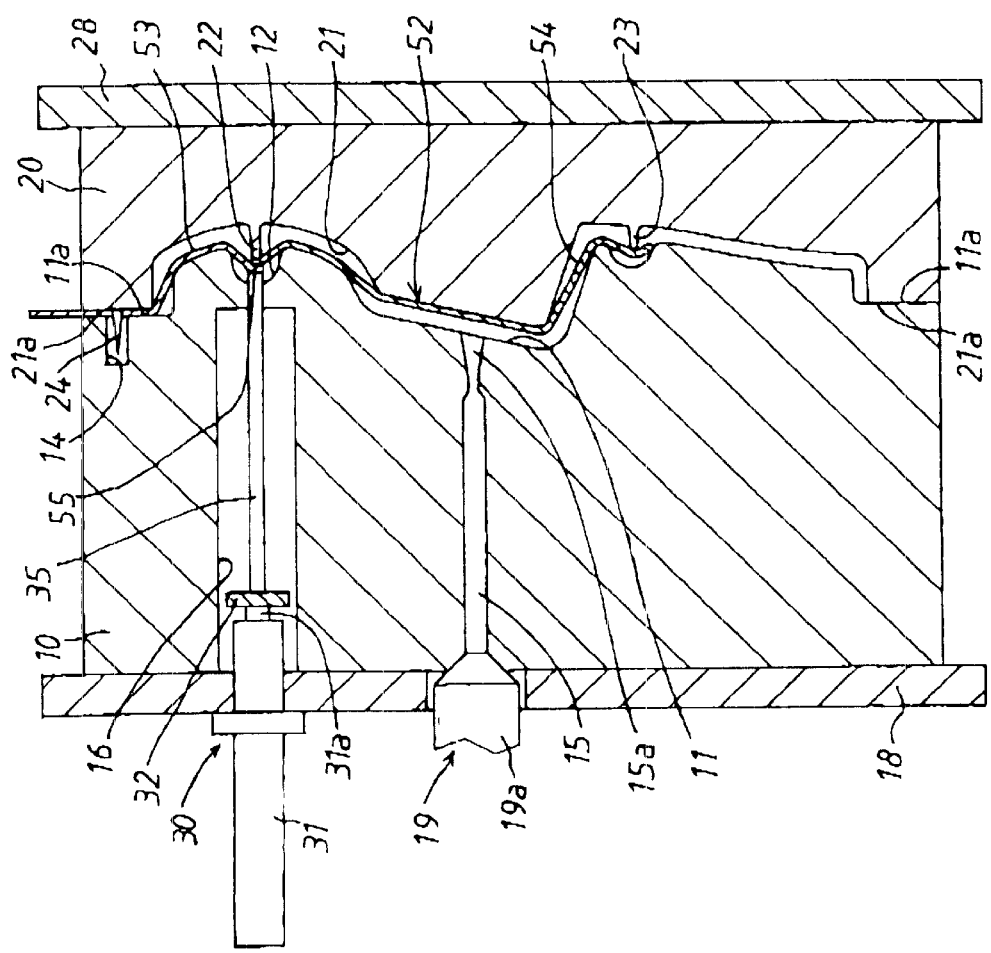
FIG. 3 is a vertical sectional view illustrating a fastening process of dies in the molding machine.

A thrust mechanism 30 for clamping the spliced portion of surface skin materials 53, 54 in the cavity die 20 includes a movable plate 32 disposed in a horizontal deep cavity 16 formed in the molding core die 10 at a position corresponding to the lateral recess 12 and a plurality of pneumatic cylinders 31 mounted to the attachment plate 18 in a horizontal direction and connected to the movable plate 32 at their piston rods 31a. The movable plate 32 is formed in the same length as that of the lateral recess 12. Thrust rods 35 are fixed to the central portion and opposite end portions of movable plate 32 and extended toward the internal projection 22 of molding die 20 across the lateral recess 12. The thrust rods 35 are slidably supported within the corresponding through holes 12a formed in the molding core die 10 across the lateral recess 12. In a condition where the pneumatic cylinders 31 are inoperative to retain the movable plate 32 in its retracted position, the distal ends of thrust rods 35 are located to coincide with the bottom of lateral recess 12. When the pneumatic cylinders 31 are activated to move the movable plate 32 forward in a condition where the cavity die 20 has been moved toward the stationary molding core die 10 in a predetermined distance, the distal ends of thrust rods 31 are brought into engagement with the corresponding internal projection 22 of cavity die 20 as shown in FIG. 2.

The stationary molding core die 10 has an injection hole 15 the nozzle 15a of which is opened toward the molding surface 11 covered with the surface skin 52. The injection hole 15 is connected to an extrusion head 19a of an injection device 19 which is mounted to the attachment plate 18 of core die 10 to supply melted synthetic resin 51A for formation of the substrate material 51. In a practical embodiment, the injection hole 15 may be provided in the form of a manifold hole in open communication with a plurality of nozzles 15a opening toward the molding surface 11. In addition, it is preferable that a heater (not shown) is provided around the injection hole 15 to prevent cooling of the melted synthetic resin supplied from the injection device 19. At the peripheral portion of cavity die 20, a plurality of needles 24 are planted on the abutment surface 21a of cavity die 20 for retaining a peripheral edge portion of the surface skin 52, while the molding core die 10 is formed with an escapement recess 14 located at its abutment surface 11a to permit entry of the needles 24.

In a production process of the door trim panel M, the two kinds of surface skin materials 53 and 54 different in color and decorative pattern are preliminarily spliced at their edge portions 55 in the form of a splice line to prepare the surface skin 52. The cavity die 20 positioned as shown by two-dots and chain lines 20A in FIG. 1 and is forwarded toward the stationary core die 10 in a predetermined distance and retained in a position shown by solid lines in the figure. In such a condition, the carrying-in device 40 is operated by the industrial robot (not shown) in such a manner that the absorptive cups 45 are brought into engagement with the rear surfaces of surface skin material 53, 54 placed on the support tool in a horizontal condition and that the surface skin materials 53, 54 retained by the absorptive cups 45 are placed in a vertical direction Z and brought into the space between the confronted molding dies 10 and 20. Subsequently, the carrying-in device 40 is operated by the industrial robot in such a manner that the surface skin materials 53, 54 are moved toward the molding surface 21 of cavity die 20 in a horizontal direction X and that the spliced portion 55 of surface skin materials 53, 54 is positioned and maintained in engagement with the internal projection 22 in a condition where the surface skin layers 53a, 54a of surface skin materials 53, 54 are faced to the molding surface 21 of cavity die 20. In this instance, the surface skin material 53 placed at the upper side is pieced by the needles 24 at its peripheral edge portion and retained in position.

At the following process, the movable plate 32 is forwarded by operation of the pneumatic cylinders 31 of thrust mechanism 30 so that the thrust rods 35 are projected from the lateral recess 12 toward the cavity die 20 across spaces between the vertical beams 43 of carrying-in device 40 and brought into engagement with the spliced portion 55 of surface skin materials 53, 54 preliminarily retained on the internal projection 22 of cavity die 20. Thus, the spliced portion 55 of surface skin materials 53, 54 is clamped by the thrust rods 35 in place, and the upper portion of surface skin material 53 is retained by the needles 24 in place as shown in FIG. 2 Thereafter, the absorptive cups 45 are disengaged from the surface skin 52 by release of the negative pressure therefrom and retracted to the exterior by operation of the industrial robot.

Subsequently, the cavity die 20 is forwarded toward the core die 10, while the thrust rods 35 and movable plate 32 are moved backward by forward movement of the cavity die 20 against the pneumatic pressure in cylinder 31. When the cavity die 20 is abutted against the core die 10 through the surface skin material 53 at its upper portion and engaged with the core die 10 at its lower portion, the forward movement of cavity die 20 is restricted. As a result, a space for formation of the substrate 51A is formed between the molding surfaces 11 and 21 of dies 10 and 20, and the surface skin materials 53, 54 are partly deformed by engagement with the molding surfaces 11 and 12 and enclosed in the forming space. In such a condition, as shown in FIGS.

3 and 5, the spliced portion 55 of surface skin materials 53, 54 is firmly retained in place by engagement with the distal ends of thrust rods 35, and the needles 24 are entered into the escapement holes 14 of core die 10. In addition, the lower side edge portion of surface skin material 54 is located in engagement with the internal projection 23 of cavity die 20.

Figure 4:
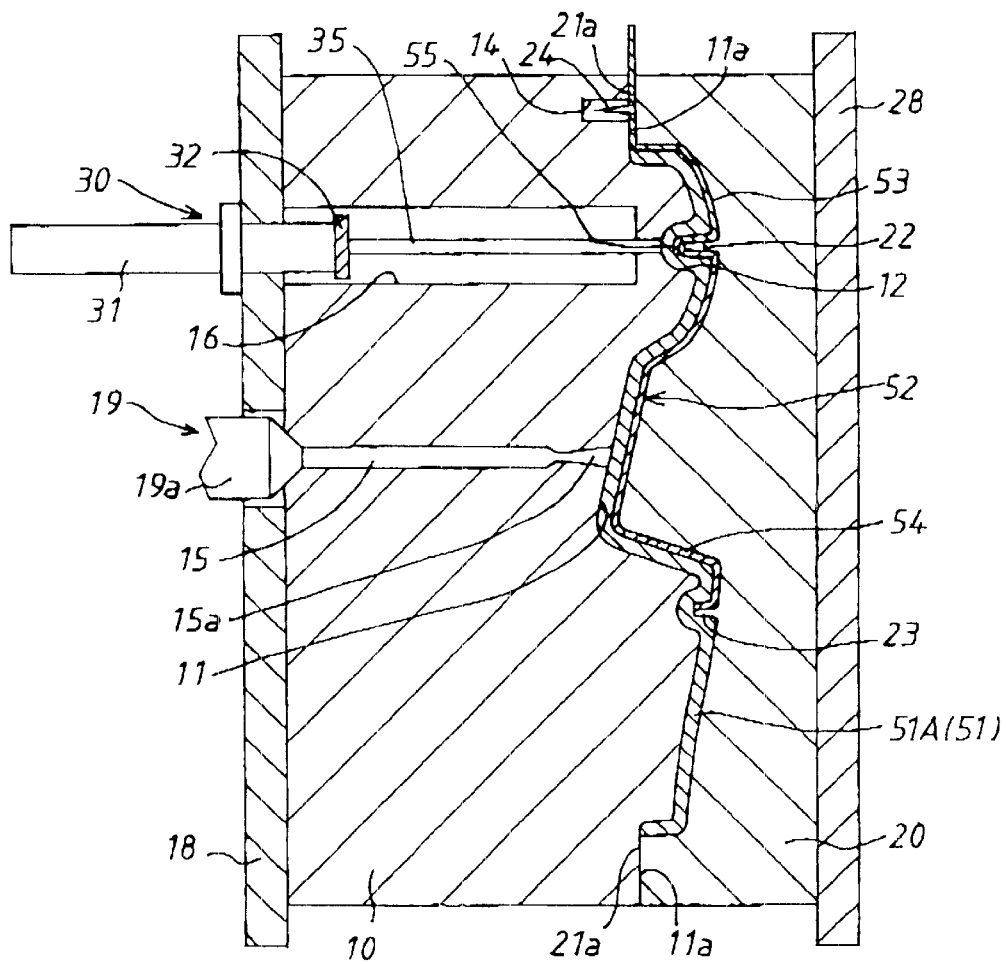
FIG. 4 is a vertical section view illustrating an injection process of melted synthetic resin in the molding machine.
Figure 5:
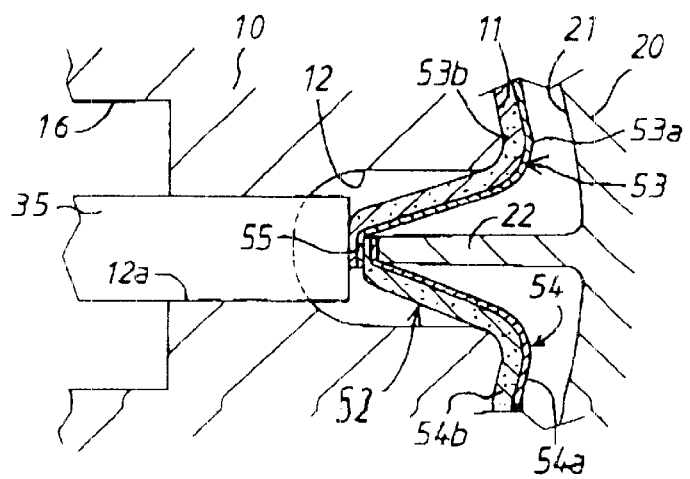
FIG. 5 is an enlarged sectional view illustrating a projected portion of the splice of the surface skin materials at a step immediately after the fastening process of the molding dies.
Figure 6:
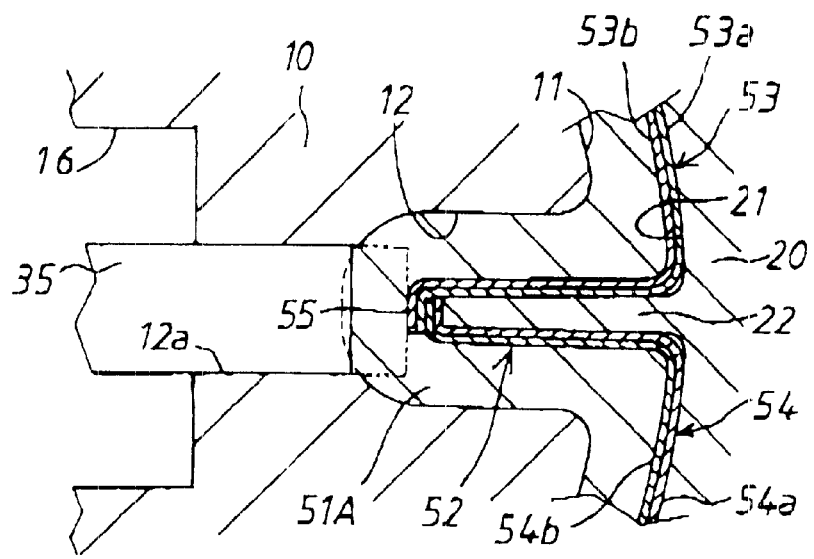
FIG. 6 is an enlarged sectional view illustrating the projected portion of the splice of the surface skin materials at a step immediately after the injection process of melted synthetic resin.
Figure 7:
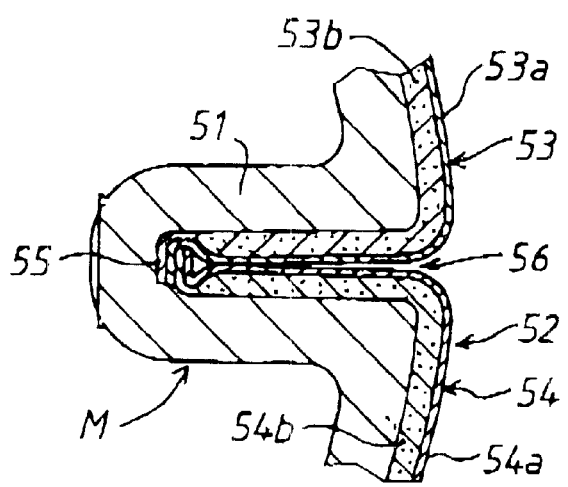
FIG. 7 is an enlarged sectional view illustrating the splice of the surface skin materials molded in an interior door panel produced by the molding machine.

At a filling process of synthetic resin conducted after the clamping process of the molding dies 10 and 20, melted synthetic resin 51A is injected from the extrusion head 19a of injection device 19 and filled in the space between the molding surfaces 11 and 21 of core die 10 and cavity die 20 and in the space between the molding surface of core die 10 and the surface skin materials 53, 54. During the filling process of synthetic resin, the spliced portion 55 of surface skin materials 53, 54 is firmly retained by engagement with the thrust rods 35 and internal projection 22 of cavity die 20. Thus, the surface skin materials 53, 54 of surface skin 52 are stretched by the synthetic resin without causing any displacement of the spliced portion 55 and molded with the synthetic resin in a predetermined shape defined by the molding surface 21 of cavity die 20 as shown in FIGS. 4 and 6. In this instance, the filling pressure of synthetic resin becomes considerably higher (for instance, 200 kg/cm2) at the final stage, and the movable plate 32 is retracted by the filling pressure applied to the distal ends of thrust rods 35 against the pneumatic pressure of cylinders 31. At the final stage of the filling process of synthetic resin, the distal ends of thrust rods 35 are located at the bottom of lateral recess 12 as shown in FIG. 6, and the foamed layers 53b, 54b of surface skin materials 53, 54 are formed in an elastically compressed condition as shown in FIG. 4. As the retraction of thrust rods 35 is caused by the filling pressure of synthetic resin immediately before the final stage of the filling process and after the formation of the surface skin 52, the spliced portion 55 of surface skin materials 53, 54 is retained in place without causing any displacement of the surface skin materials during the molding process of the door trim panel M.

When the cavity die 20 is retracted after the synthetic resin was hardened by cooling, a door trim panel M integrally molded with the surface skin materials 53, 54 can be obtained. In the door trim panel M obtained by the foregoing processes, the spliced portion 55 of face skin materials 53, 54 is placed in an innermost portion of a groove or valley 56 formed by the internal projection 22 of cavity die 20 and is completely concealed in the groove or valley 56. Similarly, the outer peripheral edge of surface skin material 54 is concealed in a groove or valley formed by the internal projection 23 of cavity die 20 as shown in FIG. 4.

In the production process of the door trim panel M, the preliminarily spliced two kinds of surface skin materials 53, 54 are introduced into the molding machine in such a manner that the spliced portion 55 of surface skin materials 53, 54 is brought into engagement with the internal projection 22 of cavity die 20, and the spliced portion 55 of surface skin materials 53, 54 is clamped by the thrust rods 35 projected from the core die 10 at the clamping process of molding dies 10 and 20 and retained in place by engagement with the internal projection 22 of cavity die 20 during the filling process of melted synthetic resin to integrally mold the substrate material 51 with the surface skin materials 53 and 54. Thus, the manufacture of an interior trim component such as the door trim panel M can be automated without any manual process to enhance the manufacturing efficiency of this kind of interior trim components.

As in the embodiment, the surface skin materials 53, 54 each are composed of a surface skin layer laminated with a foamed layer at its rear surface, the foamed layers of the surface skin materials 53, 54 are elastically compressed by the filling pressure of synthetic resin and returned to the original shape when taken out of the molding dies 10 and 20. As result, a soft touch surface skin is formed on the substrate material 51, and the groove or valley 56 formed by the internal projection 22 of cavity die 20 becomes narrow for enhancing the appearance of the door trim panel.

It is also noted that in the embodiment, the pneumatic pressure of cylinders 31 is adjusted in such a manner that the thrust rods 35 are retracted by the filling pressure of synthetic resin and that the distal ends of thrust rods 35 are located to coincide with the bottom of lateral recess 12 at the final stage of the filling process of synthetic resin. With such adjustment of the pneumatic pressure of cylinders 31, the spliced portion 55 of surface skin materials 53, 54 is filled with the synthetic resin at its rear side so that the rear surface of the substrate material 51 is formed without any slit at the opposite side of the groove or valley 56 to avoid deterioration of the strength of the substrate material.

Although in this embodiment, the thrust rods 35 are adapted to fasten the spliced portion 55 of surface skin 52 to the internal projection 22 of cavity die 20, the thrust rods 35 may be replaced with a thrust plate of the same width as that of the internal projection 22 to fasten the spliced portion 55 of surface skin 52 to the internal projection 22 at the entire width in a more reliable manner.

Figure 10:
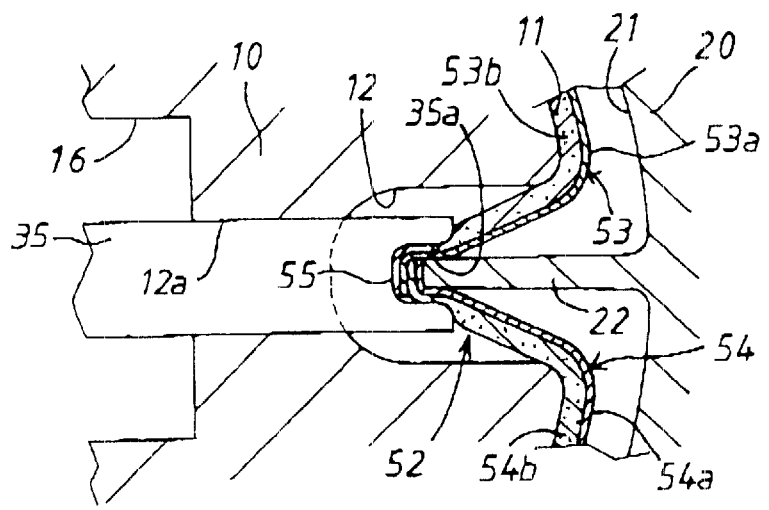
FIG. 10 is an enlarged sectional view illustrating a modification of the molding machine shown in FIG. 1, which corresponds with the illustration of FIG. 5.
Figure 11:
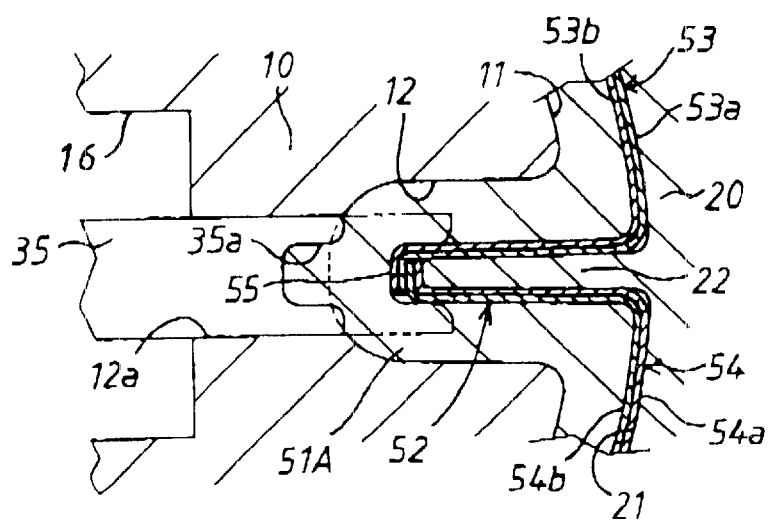
FIG. 11 is an enlarged sectional view illustrating the modification of the molding machine, which corresponds with the illustration of FIG. 6.
Figure 12:
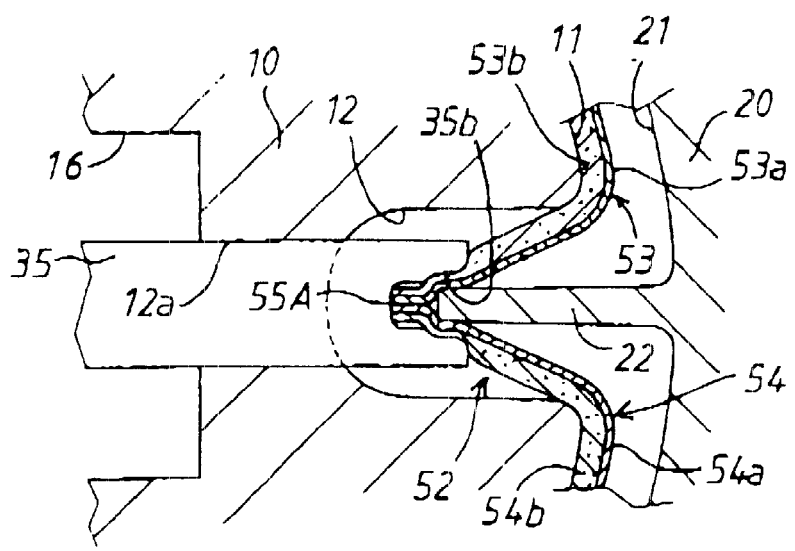
FIG. 12 is an enlarged sectional view illustrating another modification of the molding machine shown in FIG. 1, which corresponds with the illustration of FIG. 5.
Figure 13:
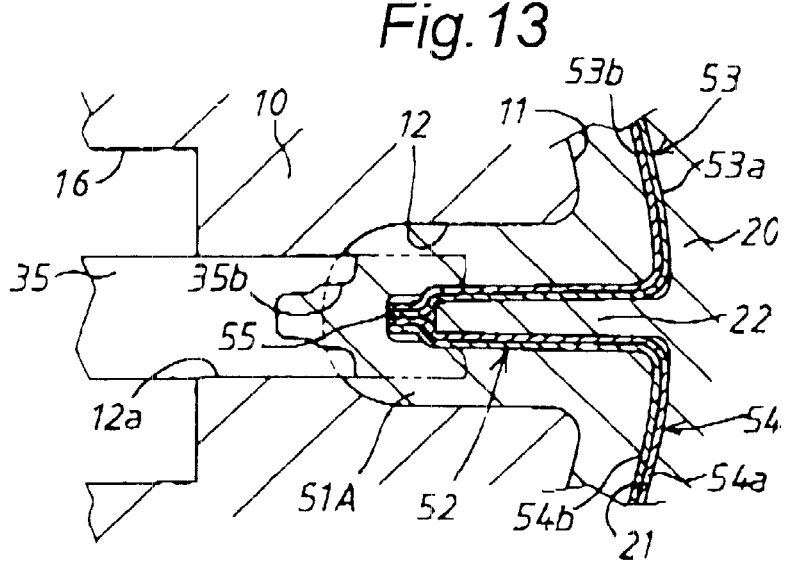
FIG. 13 is an enlarged sectional view illustrating the modification of the molding machine, which corresponds with the illustration of FIG. 6.

Illustrated in FIGS. 10 and 11 is a modification of the thrust rods 35 wherein a lateral recess 35a is formed on each distal end of thrust rods 35 to clamp the surface skin 52 at the opposite sides of the internal projection 22 when the spliced portion 55 of surface skin 52 is fastened to the internal projection 22 of cavity die 20. With the lateral recess 35a formed on the distal end of thrust rod 35, the spliced portion 55 of surface skin 52 is more accurately clamped between the distal end of thrust rod 35 and the internal projection 22 of cavity die 20 without any displacement. Thus, the spliced portion 55 of surface skill 52 is accurately concealed in the groove or valley 56 of the substrate material 51. This is useful to reduce the occurrence of defects in appearance of the door trim panel. In this modification, the thrust rods 35 are retracted by the filling pressure of melted synthetic resin supplied from the extrusion head 19 of the injection machine so that the distal ends of thrust rods 35 are placed to coincide with the bottom of lateral recess 12 at the final stage of the filling process of melted synthetic resin as shown in FIG. 11. Thus, the rear surface of the substrate material 51 is formed without any slit at the opposite side of the groove or valley 56. Although in the modification, the lateral recess 35a is formed in a U-shape in cross section for engagement with the spliced portion 55 of surface skin 52 at its bottom and opposite sides, the lateral recess 35a may be formed in a V-shape in cross section.

Figure 14:
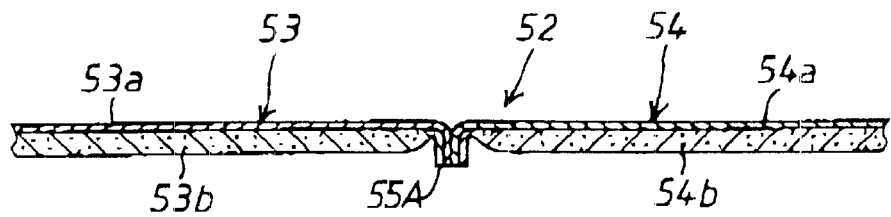
FIG. 14 is an enlarged sectional view illustrating a splice of surface skin materials used in the modification shown in FIGS. 12 and 13.

Although in the foregoing embodiment, the surface skin materials 53 and 54 are preliminarily overlapped at their edge portions and jointed with each other in a splice line by ultrasonic welding, the peripheral edges of surface skin materials 53, 54 may be engaged with each other at their surface skin layers 53a, 54b and jointed at a splice portion 55A by ultrasonic welding, as shown in FIG. 14. In such a case, the lateral recess 35a of thrust rods 35 are formed to correspond with the configuration of splice portion 55A.

Figure 15:
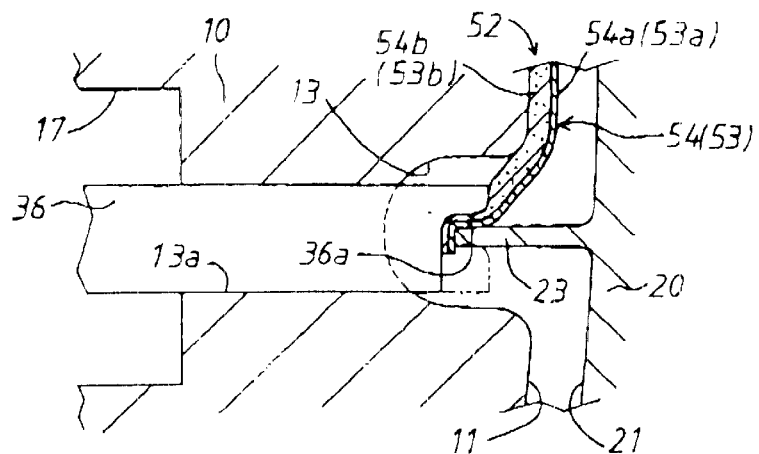
FIG. 15 is an enlarged sectional view illustrating a further modification of the molding machine shown in FIG. 1.

Although in the foregoing embodiment, the peripheral portion of surface skin 52 is pressed to the internal projection 23 of cavity die 20 during the filling process of melted synthetic resin and concealed in the groove or valley 57 formed by the internal projection 23, additional thrust rods 36 may be assembled within the stationary core die 10 in the same manner as the thrust rods 35 to clamp the peripheral edge portion of surface skin 52 as shown in FIG. 15. In such a case, the thrust rods 36 each are formed with a recess 36a of an L-letter shape in cross-section which is located to coincide with the bottom of lateral recess 13 when the thrust rods are retracted by the filling pressure of melted synthetic resin. (see FIG. 16)

Figure 16:
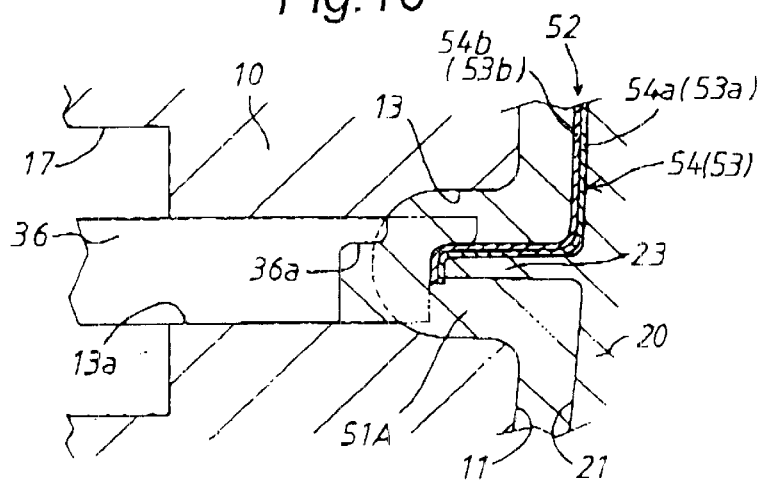
FIG. 16 is an enlarged sectional view illustrating a splice of surface skin materials at a step immediately after an injection process of melted synthetic resin in the modification shown in FIG. 15.
Figure 17:
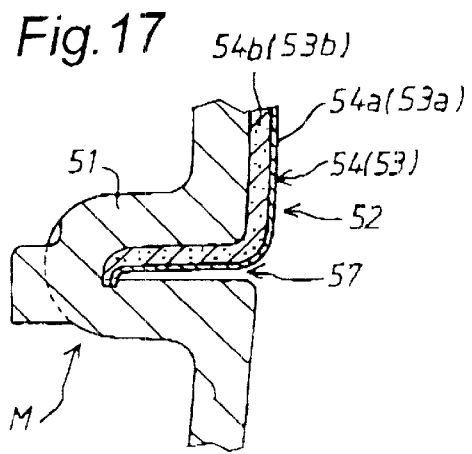
FIG. 17 is an enlarged sectional view illustrating the splice of the surface skin materials molded in an interior door panel produced in the modification shown in FIGS. 15 and 16.

In operation of the molding machine, when the thrust rods 35 are forwarded by operation of the pneumatic cylinders 31 at the clamping process of the molding dies 10 and 20 to fasten the spliced portion 55 of surface skin 52 to the internal projection 22 of cavity die 20, the thrust rods 36 are simultaneously forwarded by operation of the pneumatic cylinders so that the peripheral edge portion of surface skin 52 is fastened to the internal projection 23 by engagement with the recessed portion 36a formed on the distal end of thrust rods 36 as shown in FIG. 15. When the space formed between the molding surfaces 11 and 21 of dies 10, 20 is filled with melted synthetic resin 51A at the filling process of synthetic resin, the thrust rods 35 and 36 are retracted by the filling pressure of melted synthetic resin 51A so that the distal ends of thrust rods 35 and 36 are placed to coincide with each bottom of the lateral recesses 12 and 13 of core die 10. During retraction of the thrust rods 35 and 36, the surface skin 52 is molded with the melted synthetic resin 51A in a condition where the spliced portion 55 and peripheral edge portion of surface skin materials 53, 54 are retained in place on the internal projections 22 and 23 of cavity die 20 without causing any displacement thereof as shown in FIG. 16. When the cavity die 20 is retracted after the synthetic resin 51A was hardened by cooling, a door trim panel M integrally molded with the surface skin 52 can be obtained. In the door trim panel M, the peripheral edge portion of surface skin 52 is positioned in an innermost portion of a groove or valley 57 formed by the internal projection 23 of cavity die 20 and is completely concealed in the groove or valley 57 as shown in FIG. 17.

As the foamed layers 53b, 54b of the surface skin materials 53, 54 are elastically compressed by the filling pressure of melted synthetic resin and returned to the original condition when taken out of the molding dies 10 and 20. As a result, the substrate 51 of the trim panel is covered with a soft touch surface skin, and the width of groove or valley 57 becomes narrow for enhancing the appearance of the door trim panel.

In the production process of the door trim panel, the two kinds of spliced surface skin materials 53, 54 are introduced into the molding machine in such a manner that the spliced portion 55 of surface skin materials 53, 54 is brought into engagement with the internal projection 22 of cavity die 20, and the spliced portion of surface skin materials 53, 54 is clamped by the thrust rods 35 at the clamping process of the molding dies 10 and 20 and retained in place by engagement with the internal projection 22 of cavity die 20 during the filling process of melted synthetic resin to integrally form the substrate material 51 with the surface skin materials 53, 54 in such a manner that the spliced portion 55 of surface skin 52 is concealed in the groove or valley formed in the substrate material. Thus, the manufacture of an interior trim component such as the door trim panel can be automated without any manual process to enhance the manufacturing efficiency of this kind of interior trim components.

What is claimed is:

1. A production method of an interior trim component cove red with a surface skin material having a plurality of different portions in such a manner that each boundary line where the different portions join is hidden in a groove or valley provided in a substrate of the trim component, comprising the steps of:

introducing the surface skin material into a space between a pair of confronted molding dies and positioning the boundary line of the surface skin material in engagement with an internal projection formed on a molding surface of one of the molding dies, the internal projection being located across from a corresponding recess in the other molding die;

forwarding a thrust member assembled within the other molding die to be projected from the corresponding recess in its molding surface toward the internal projection of the confronted molding die and bringing a distal end of the thrust member into engagement with the boundary line of the surface skin material to retain the surface skin material in place on the internal projection of the confronted molding die;

is clamping the molding dies in a condition where the distal end of the thrust member is maintained in engagement with the boundary line of the surface skin material positioned on the internal projection; and injecting melted synthetic resin into a space between the molding dies to form the substrate on one side of the surface skin material, the combination of the surface skin material and the substrate forming the trim component, wherein the thrust member is retracted by the melted synthetic resin injected into the space between the molding dies.

2. The production method of an interior trim component as claimed in claim 1, wherein the surface skin material is in the form of plural kinds of surface skin materials preliminarily spliced at their edge portions, and wherein the spliced portion of the surface skin materials is positioned in engagement with the internal projection of the molding die and retained in place by engagement with the distal end of the thrust member.

3. The production method of an interior trim component as claimed in claim 1, wherein the thrust member is partially retracted via engagement with the internal projection into the other molding die when both the molding dies are clamped with each other.

4. The production method of an interior trim component as claimed in claim 1, wherein the thrust member is formed at its distal end with a recess far engagement with the surface skin material at the boundary line positioned in place on the internal projection of the molding die.

5. The production method of an interior trim component as claimed in claim 1, wherein the different portions of the surface skin material overlap at the boundary line.

6. The production method of an interior trim component as claimed in claim 1, wherein the different portions of the surface skin material engage with each other at the boundary line.

7. The production method of an interior trim component as claimed in claim 2, wherein the surface skin materials are spliced by ultrasonic welding.

* * * * *

UNITED STATES PATENT AND TRADEMARK OFFICE
CERTIFICATE OF CORRECTION

PATENT NO. : 6,673,296 B2
DATED : January 6, 2004
INVENTOR(S) : Yoshihiko Hiraiwa et al.

It is certified that error appears in the above-identified patent and that said Letters Patent is hereby corrected as shown below:

Column 10,
Line 2, please replace "cove red" with -- covered --.
Line 24, please replace "is clamping" with -- clamping --.

Signed and Sealed this

Twenty-second Day of June, 2004

JON W. DUDAS
*Acting Director of the United States Patent and Trademark Office*